(12) United States Patent
Maruyama

(10) Patent No.: US 8,769,157 B2
(45) Date of Patent: Jul. 1, 2014

(54) COMMUNICATION APPARATUS, INTERFACE CARD, AND FAILURE HANDLING METHOD

(75) Inventor: Ryo Maruyama, Kanagawa (JP)

(73) Assignee: Fujitsu Telecom Networks Limited, Kanagawa (JP)

(\*) Notice: Subject to any disclaimer, the term of this patent is extended or adjusted under 35 U.S.C. 154(b) by 633 days.

(21) Appl. No.: 12/718,851

(22) Filed: Mar. 5, 2010

(65) Prior Publication Data

US 2011/0113154 A1 May 12, 2011

(30) Foreign Application Priority Data

Nov. 12, 2009 (JP) ................................ 2009-258886

(51) Int. Cl.
   *G06F 15/16* (2006.01)
   *H04L 12/437* (2006.01)

(52) U.S. Cl.
   CPC .................................. *H04L 12/437* (2013.01)
   USPC ......................................................... 709/251

(58) Field of Classification Search
   USPC .......................................................... 709/251
   See application file for complete search history.

(56) References Cited

U.S. PATENT DOCUMENTS

| | | | |
|---|---|---|---|
| 5,383,191 A * | 1/1995 | Hobgood et al. | 709/251 |
| 6,256,292 B1 * | 7/2001 | Ellis et al. | 370/227 |
| 6,615,362 B1 * | 9/2003 | Daruwalla et al. | 714/4.1 |
| 6,647,428 B1 * | 11/2003 | Bannai et al. | 709/245 |
| 6,820,210 B1 * | 11/2004 | Daruwalla et al. | 714/4.1 |
| 7,599,315 B2 * | 10/2009 | Cornet et al. | 370/258 |
| 7,782,762 B2 * | 8/2010 | Xu | 370/218 |
| 2003/0018788 A1 * | 1/2003 | Zsohar | 709/227 |
| 2003/0154285 A1 * | 8/2003 | Berglund et al. | 709/227 |
| 2005/0015470 A1 * | 1/2005 | de Heer et al. | 709/221 |
| 2008/0126536 A1 * | 5/2008 | Sakurai | 709/224 |

FOREIGN PATENT DOCUMENTS

JP   2006-229477   8/2006

\* cited by examiner

*Primary Examiner* — Phuoc Nguyen
(74) *Attorney, Agent, or Firm* — Ladas & Parry, LLP

(57) ABSTRACT

A communication apparatus of the embodiment is provided with a first IF card that performs a relay process of a data frame in a first direction of a ring network, a second IF card that performs a relay process of a data frame in a second direction of the ring network, a communication-status determination unit that monitors the communication status from the first IF card to the second IF card, a block control unit that sets a new block point to either the first IF card or the second IF card when the communication status is abnormal, and a ring protocol processor that notifies other communication apparatuses that constitute the ring network of information for notifying the switching of a block point in the ring network, which indicates that the new block point has been set.

8 Claims, 13 Drawing Sheets

COMMUNICATION SYSTEM 100

COMMUNICATION SYSTEM 100

COMMUNICATION SYSTEM 100

COMMUNICATION SYSTEM 100

COMMUNICATION APPARATUS, INTERFACE CARD, AND FAILURE HANDLING METHOD

CROSS-REFERENCE TO RELATED APPLICATIONS

This application claims priority to Japan Application No. 2009-258886 filed on Nov. 12, 2009, the disclosure of which is incorporated herein by reference.

BACKGROUND OF THE INVENTION

1. Field of the Invention

The present invention relates to data communication techniques and particularly to communication apparatuses that constitute a ring network, to interface cards to be installed in the communication apparatuses, and to a failure handling method performed by the communication apparatuses.

2. Description of the Related Art

As a highly-reliable communication network, a communication network in which multiple communication apparatuses that relay a data frame are connected in a ring shape, that is, a so-called ring network is often built. Data frame looping needs to be prevented in a ring network. Thus, by using a protocol for ring control (hereinafter, referred to as a "ring protocol"), at least one port of a communication apparatus is often set as a port that blocks the relay of a data frame (hereinafter, referred to as a "block point").

Upon the generation of a failure in the communication line between communication apparatuses, the setting position of a block point is dynamically changed based on the ring protocol so that a data frame is not transmitted to the communication line where the failure has been generated. This allows for the data frame transmission to be continued by bypassing the communication line where the failure has been generated.

[Patent document 1] Japanese Laid-Open Publication No. 2006-229477

Conventional ring protocols are directed to maintain the transmission of data frames when a failure is generated in the communication lines among communication apparatuses. The transmission of the data frames is not sometimes able to be maintained when a failure is generated inside the communication apparatuses.

SUMMARY OF THE INVENTION

In this background, a purpose of the present invention is to provide a technique for improving the fault tolerance of a ring network.

A communication apparatus according to one embodiment of the present invention comprises: a first relay unit operative to perform a relay process of a data frame in a first direction of the ring network; a second relay unit operative to perform a relay process of a data frame in a second direction, which is different from the first direction, of the ring network; a monitoring unit operative to monitor the communication status from the first relay unit to the second relay unit; a block control unit operative to set a new block point to either the first relay unit or the second relay unit when the communication status is abnormal; and a notification unit operative to notify other communication apparatuses that constitute the ring network of information for notifying the switching of a block point in the ring network, which indicates that the new block point has been set.

The communication status from the first relay unit to the second relay unit may include all or some of the communication status inside the first relay unit, the communication status between the first relay unit and the second relay unit, and the communication status inside the second relay unit. The standard for determining the normality of the communication status may be the presence of communication between the first relay unit and the second relay unit, in other words, the transmission of a data frame for monitoring. The standard for determining may be the transmission of the data frame for monitoring without an error. The other communication apparatus that has received the information indicating that the new block point has been set may deactivate, in other words, disable the current block point. The setting of the path of a data frame may be changed so as to bypass the new block point. A communication apparatus according to the embodiment may be all or some of the multiple communication apparatuses that constitute a ring network.

According to the present embodiment, in the case a failure is generated inside a communication apparatus, a new block point of the communication apparatus is set. As a result, the transmission path of a data frame is changed based on the ring protocol so as to bypass the new block point. This allows for the transmission of a data frame to be easily maintained even when a failure is generated inside the communication apparatus.

The monitoring unit may monitor, from the communication status from the first relay unit to the second relay unit, the communication status inside the first relay unit, as a first communication status, and the communication status inside the second relay unit, as a second communication status, and the block control unit may set a new block point to the first relay unit when the first communication status is abnormal and may set a new block point to the second relay unit when the second communication status is abnormal.

The monitoring unit may monitor, when monitoring the communication status inside the first relay unit and the second relay unit, the communication status between the interface of each relay unit to the ring network and the interface of the relay unit to the internal side of the apparatus. The block control unit may set a block point to the interface, of either the first relay unit or the second relay unit, to the ring network or set a block point to the interface to the internal side of the apparatus.

According to the present embodiment, a block point can be set to a relay unit in which a failure is generated. This ensures the relay of a data frame with the ring network 10 via a relay unit in which no failure is generated, allowing for the data frame to be relayed by a communication apparatus to be easily saved.

The first relay unit and the second relay unit each may include: a ring interface that works as an interface to the ring network; one other interface that works as an interface to another communication network different from the ring network; and an internal interface that relays both the data frame relayed via the ring interface and the data frame relayed via said other interface to another processor inside the apparatus in an integrated fashion. The block control unit may set a new block point to at least the internal interface of the relay unit, either the first relay unit or the second relay unit, to which the new block point needs to be set.

Another processor inside the apparatus may be another relay unit, that is different from the relay units of the apparatus, or may be a switching unit that controls the transmission path of data frames, in other words, that performs a process of allocating the data frames to multiple relay units. The block control unit may set a new block point to a ring interface.

According to the present embodiment, since a block point is set to the internal interface of the relay unit in which a failure is generated, the relay of a data frame via the relay unit can be disconnected in an integrated fashion even when the relay unit has an external interface to multiple communication networks. For example, a situation is considered where a failure is detected between the first ring interface and the internal interface of a relay unit that are connected to multiple ring networks. In this case, a new block point is also set to the ring network that uses a second ring interface different from the first ring interface, and the transmission path of a data frame is also changed in the ring network so as to bypass the new block point.

The monitoring unit may monitor, from the communication status from the first relay unit to the second relay unit, the communication status inside either the first relay unit or the second relay unit as an internal communication status, and the block control unit may set a new block point to the relay unit, either the first relay unit or the second relay unit, whose communication status is being monitored, when the internal communication status is abnormal.

According to the present embodiment, the internal communication status is monitored in either the first relay unit or the second relay unit, and depending on the abnormality of the internal communication status, a block point is set to the relay unit corresponding to the internal communication status. In other words, the internal communication status does not need to be monitored in all the relay units, and a communication apparatus can thus be achieved that allows interfaces with different intervals for monitoring to coexist. In addition, gradual enhancement of functions in units of relay units can be achieved in the communication apparatus.

The relay unit, either the first relay unit or the second relay unit, whose internal communication status is being monitored may include: a ring interface that works as an interface to the ring network; one other interface that works as an interface to another communication network different from the ring network; and an internal interface that relays both the data frame relayed via the ring interface and the data frame relayed via said other interface to another processor inside the apparatus in an integrated fashion. The block control unit may set, when setting a new block point to either the first relay unit or the second relay unit, whose internal communication status is being monitored, the new block point to at least the internal interface of the relay unit whose internal communication status is being monitored.

According to the present embodiment, with regard to either the first relay unit or the second relay unit, the relay of a data frame via the relay unit can be disconnected in an integrated fashion even when the relay unit has an external interface to multiple communication networks. In other words, the internal communication status does not need to be monitored in all the relay units, and a communication apparatus can thus be achieved that allows interfaces with different intervals for monitoring to coexist. In addition, gradual enhancement of functions in units of relay units can be achieved in the communication apparatus.

The communication apparatus may further comprise a switching unit operative to pass, upon the receipt of a data frame to be passed to the ring network, the data frame to the relay unit, either the first relay unit or the second relay unit, to which a block point is not set, even when the block point is set to the first relay unit or the second relay unit. According to the present embodiment, the relay of a data frame with the ring network can be maintained via a relay unit to which a block point has not been set even when a failure is generated in one relay unit.

Another embodiment of the present invention relates to an interface card. The interface card mounted in a communication apparatus constituting a ring network where a block point that disconnects the relay of a data frame is set to at least one of a plurality of communication apparatuses that are connected in a ring shape comprises: a relay unit operative to perform a relay process of a data frame in a first direction of the ring network; a communication-status detection unit operative to notify a predetermined controlling process of information indicating the status of communication with another interface card that performs a relay process of a data frame in a second direction, which is different from the first direction, of the ring network; and a block setting unit operative, when being instructed to set a new block point that replaces the current block point in the ring network, to set a block point for disconnecting the relay of the data frame by the relay unit to the interface card.

According to the present embodiment, an interface card can be realized to which a new block point is to be set in the ring network, depending on the communication status of another interface card. In other words, a preferred interface card is realized for improving the fault tolerance of the ring network.

Still another embodiment of the present invention relates to a failure handling method. The failure handling method performed by the communication apparatus constituting a ring network where a block point that disconnects the relay of a data frame is set to at least one of a plurality of communication apparatuses that are connected in a ring shape comprises: monitoring the communication status inside the apparatus from the interface in the first direction of the ring network to the interface in the second direction, which is different from the first direction; setting a new block point to either the interface in the first direction or the interface in the second direction when the communication status is abnormal; and notifying other communication apparatuses that constitute the ring network of information for notifying the switching of a block point in the ring network, which indicates that the new block point has been set. According to the present embodiment, the transmission of a data frame can be easily maintained even when a failure is generated inside the communication apparatus as described above.

Optional combinations of the aforementioned constituent elements, or implementations of the invention in the form of apparatuses, methods, systems, programs, and recording mediums storing programs may also be practiced as additional modes of the present invention.

BRIEF DESCRIPTION OF DRAWINGS

Embodiments will now be described, by way of example only, with reference to the accompanying drawings which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention.

Figure 1:
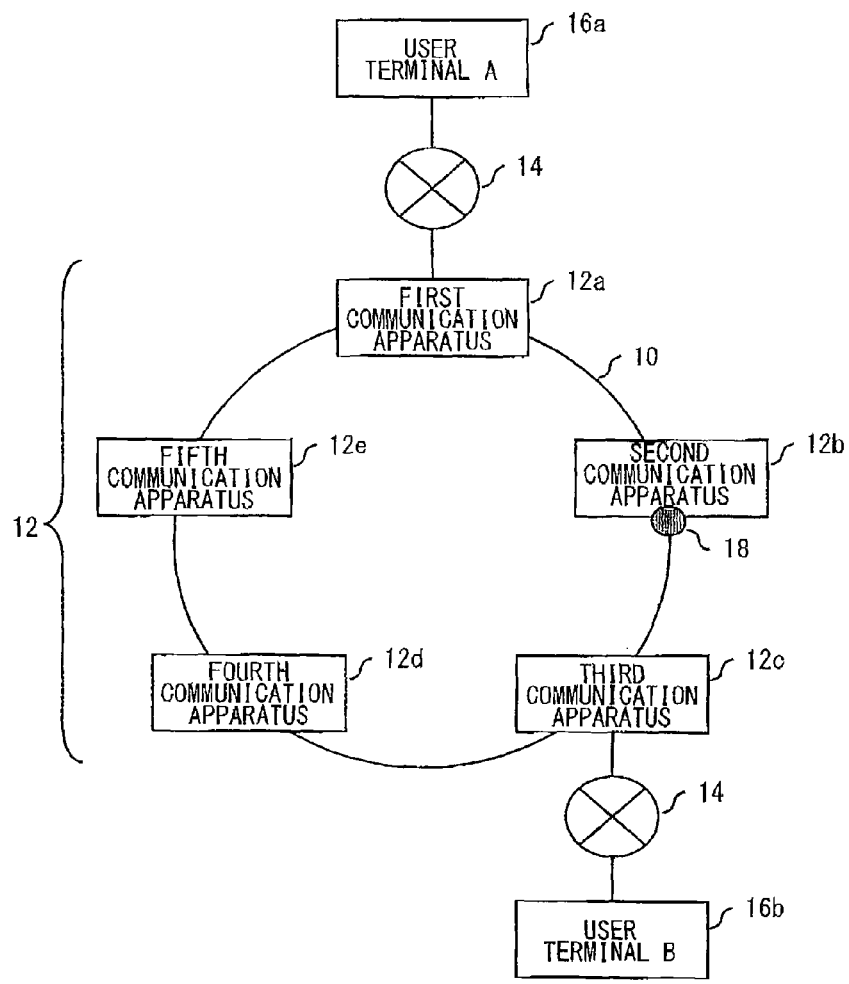
FIG. 1 is a diagram illustrating the configuration of a communication system.

FIG. 1 illustrates a communication system. In a communication system 100, a first communication apparatus 12a, a second communication apparatus 12b, a third communication apparatus 12c, a fourth communication apparatus 12d, and a fifth communication apparatus 12e, which are all generically referred to as communication apparatuses 12, are connected via a ring network 10. The ring network may be an optical fiber network.

A communication apparatus 12 receives a data frame, which is transmitted from a user terminal of the transmission source, in a predetermined format (hereinafter, also referred to as a "user frame") via one other communication network 14 that is different from the ring network 10. The communication apparatus 12 then transmits the user frame to another communication apparatus 12 that is connected to a user terminal of the transmission destination. Although not shown in FIG. 1, a user terminal 16 may be connected to the second communication apparatus 12b, the fourth communication apparatus 12d, and the fifth communication apparatus 12e.

The communication apparatuses 12 notify one another of a data frame, separately from the user frame, for monitoring the normality of a communication line in a predetermined format (hereinafter, also referred to as a "supervisory frame"). An embodiment regarding the notification of the supervisory frame is defined by a publicly-known ring protocol, and the same applies to the present embodiment.

In the communication system 100, at least one communication apparatus 12 sets a block point to itself in accordance with the ring protocol. Other communication apparatuses 12 are notified of the status of the setting of the block point by the supervisory frame. Each communication apparatus 12 determines the rule for selecting a transmission path of a user frame to be relayed so as to bypass a block point (hereinafter, also referred to as a "path-selection rule"). Then, the transmission path of the user frame is determined in accordance with the path-selection rule.

For example, in FIG. 1, a block point 18 is set to the interface of the second communication apparatus 12b on the third communication apparatus 12c side. The user frame to be transmitted from a user terminal A 16a to a user terminal B 16b is transmitted via a path that bypasses the block point 18, that is, via a path from the first communication apparatus 12a to the fifth communication apparatus 12e to the fourth communication apparatus 12d to the third communication apparatus 12c.

The communication apparatus 12 also detects a failure generated in the communication line by the transmission and reception of a supervisory frame. The communication apparatus 12 that has detected the generation of the failure in the communication line sets a new block point to the interface that leads to the communication path. The communication apparatus 12 then notifies the other communication apparatuses 12 of the status of setting of the new block point. This allows the communication apparatus 12, to which the previous block point has been set, to deactivate the block point, allowing for a user frame to be relayed. Each communication apparatus 12 changes the path-selection rule so as to bypass the new block point.

Figure 2:
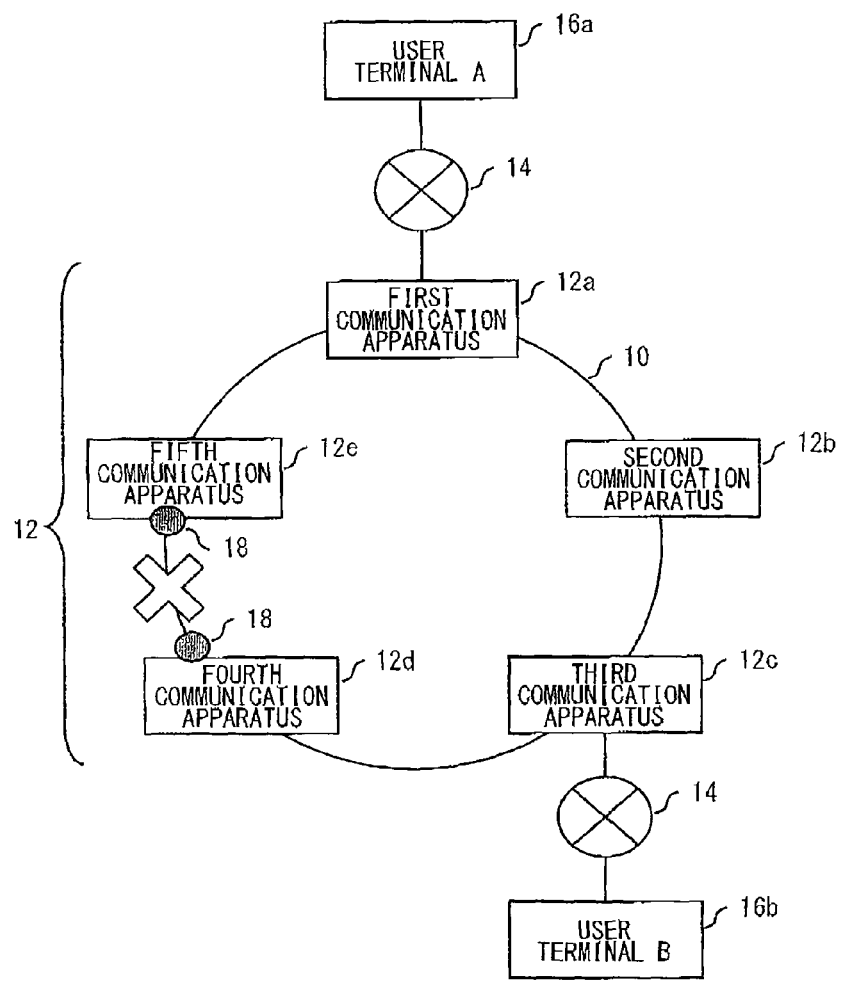
FIG. 2 is a diagram illustrating the configuration of a communication system.

FIG. 2 illustrates the configuration of a communication system. The figure shows the situation where a failure (for example, disconnection of an optical fiber) is generated in a communication line between the fourth communication apparatus 12d and the fifth communication apparatus 12e and the position of a block point is changed in the communication system 100 shown in FIG. 1.

In FIG. 2, the new block points are set to the interface of the fourth communication apparatus 12d on the fifth communication apparatus 12e side and to the interface of the fifth communication apparatus 12e on the fourth communication apparatus 12d side, respectively. The block point that has been set to the second communication apparatus 12b is deactivated. The user frame to be transmitted from the user terminal A 16a to the user terminal B 16b is transmitted via a path that bypasses the new block point 18, that is, via a path from the first communication apparatus 12a to the second communication apparatus 12b to the third communication apparatus 12c.

As shown in FIG. 2, even when a failure is generated in the communication path between the communication apparatuses 12, an alternative path is set by the dynamic setup of a block point and a path-selection rule based on the ring protocol, and the transmission of the user frame can be maintained. However, the range of supervision by the supervisory frame is limited to the communication line between the communication apparatuses 12, and the transmission of the user frame cannot be maintained sometimes when a failure is generated inside a communication apparatus 12 since a block point cannot be switched.

Figure 3:
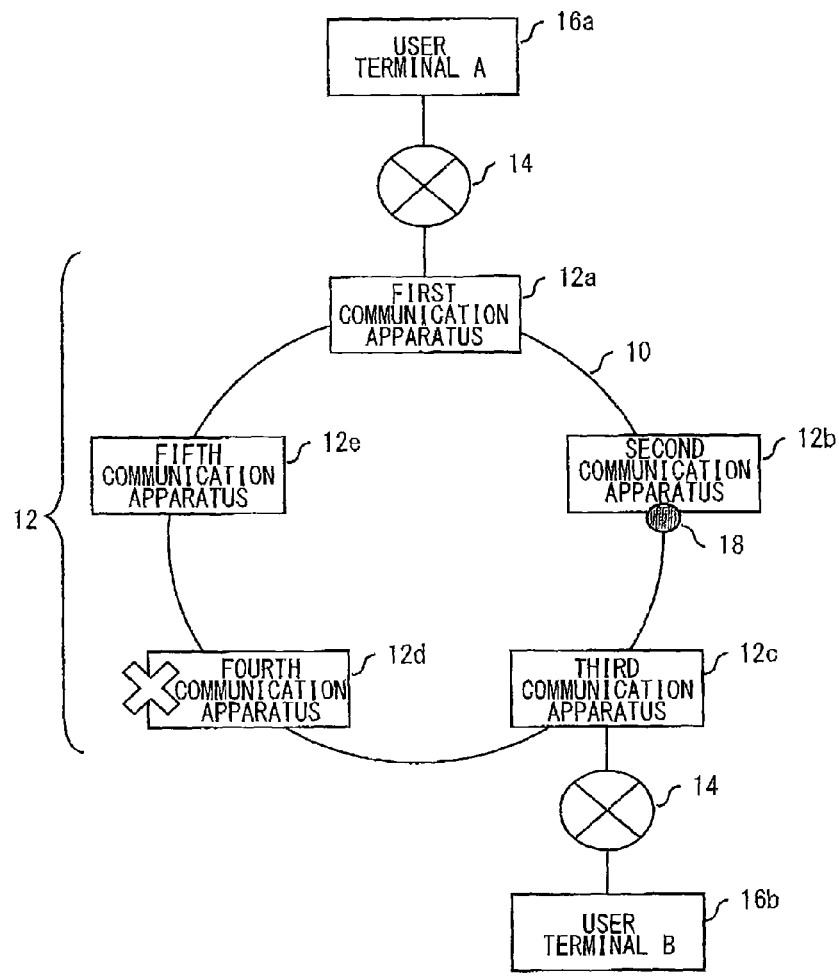
FIG. 3 is a diagram illustrating the configuration of a communication system.

FIG. 3 illustrates the configuration of a communication system. The figure shows a conventional situation where a failure (for example, a failure in a buffer of an interface card) is generated inside the fourth communication apparatus 12d in the communication system 100 shown in FIG. 1. In this case, the block point 18 of the second communication apparatus 12b stays, and a relay process cannot be performed in the fourth communication apparatus 12d. Thus, the user frame cannot be transmitted from the user terminal A 16a to the user terminal B 16b.

The communication apparatuses 12 that are suggested in the following also monitor the communication status inside the apparatuses (hereinafter, also referred to as an "internal communication status"). More specifically, a supervisory frame is transmitted among interfaces for the ring network 10 in a similar path as that used for a user frame so as to monitor the normality of the internal communication status on a regular basis. A communication apparatus 12 sets the block point 18 to itself when the internal communication status is abnormal and gives notification to other communication apparatuses 12 indicating accordingly. This allows for the current block point 18 to be deactivated and for the path-selection rule to be changed, in accordance with the ring protocol. In other words, when a failure is generated inside the communication apparatus 12, the fault tolerance of the communication system 100 is improved by using a data-frame rescue process defined by the ring protocol.

Figure 4:
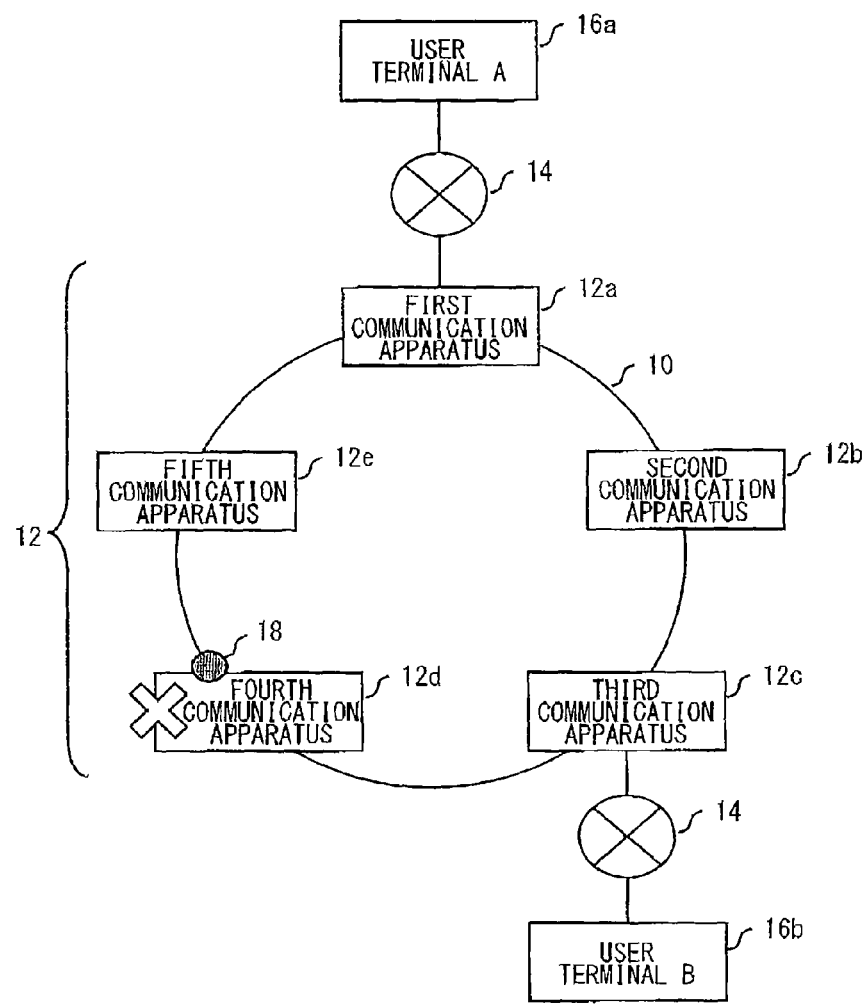
FIG. 4 is a diagram illustrating the configuration of a communication system.

FIG. 4 illustrates the configuration of a communication system. The figure shows the situation where a failure is generated inside the fourth communication apparatus 12d in the communication system 100 in FIG. 1. The fourth communication apparatus 12d sets a new block point 18 to itself, and the second communication apparatus 12b deactivates its own block point 18 that has been set to the second communication apparatus 12b. In this case, the user frame to be transmitted from the user terminal A 16a to the user terminal B 16b is transmitted via a path that bypasses the new block point 18, that is, via a path from the first communication apparatus 12a to the second communication apparatus 12b to the third communication apparatus 12c. In other words, even when a failure is generated inside a communication apparatus 12, the transmission of a data frame is maintained by using the ring protocol.

A configuration for achieving the fourth communication apparatus 12d shown in FIG. 4 is explained in the following. The following configuration does not need to be applied to all the communication apparatuses 12 in the communication system 100. The configuration may be applied to only some of the communication apparatuses 12.

First Embodiment

Figure 5:
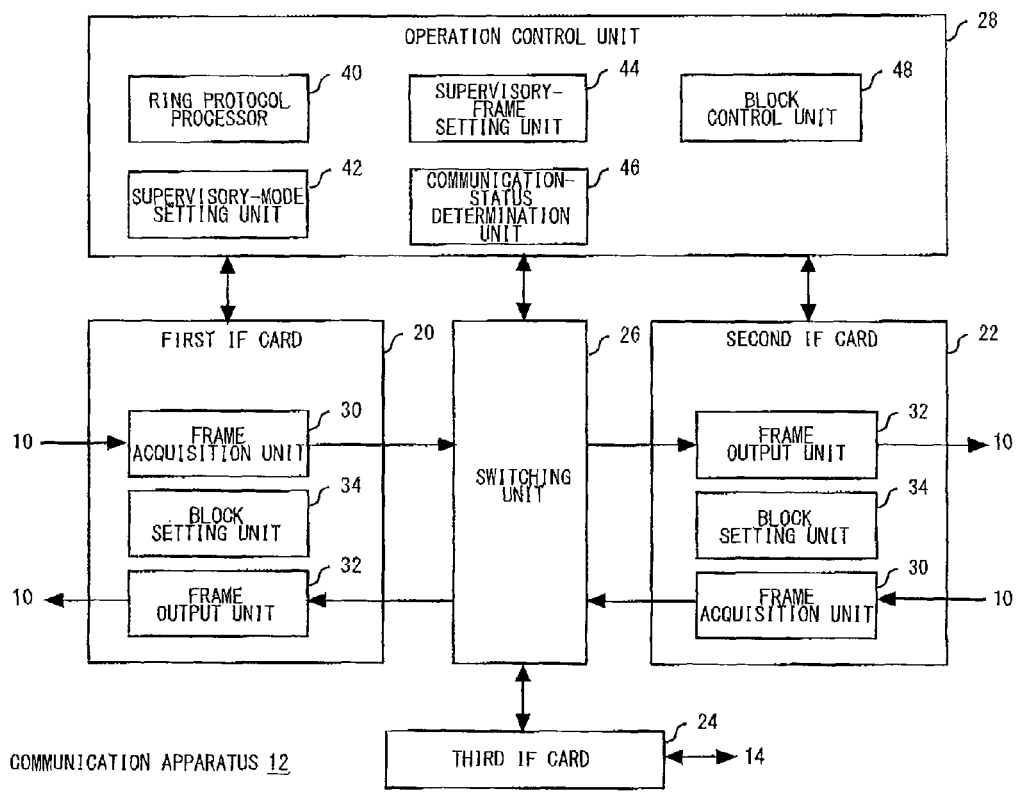
FIG. 5 is a block diagram illustrating a functional configuration, in the first embodiment, of a communication apparatus shown in FIG. 1.

FIG. 5 is a block diagram illustrating a functional configuration, in the first embodiment, of the communication apparatus 12 shown in FIG. 1. The communication apparatus 12 is provided with a first IF card 20, a second IF card 22, a third IF card 24, a switching unit 26, and an operation control unit 28.

The blocks shown in the block diagram of the specification are implemented in the hardware by any CPU or memory of a computer, other elements, or mechanical devices, and in software by a computer program or the like. FIG. 2 depicts functional blocks implemented by the cooperation of hardware and software. Thus, a person skilled in the art should appreciate that there are many ways of accomplishing these functional blocks in various forms in accordance with the components of the combination of hardware and software. For example, the first IF card 20, the second IF card 22, the third IF card 24, and the switching unit 26 all shown in FIG. 5 may be achieved by hardware, and the operation control unit 28 may be achieved by software. The function of the operation control unit 28 may be implemented as a program, stored in the main memory of the communication apparatuses 12, and retrieved and executed by a processor. The same applies to other diagrams.

The first IF card 20 is an interface card that provides an interface function for one direction of the ring network 10 (hereinafter, referred to as a "first direction" for descriptive purposes). The second IF card 22 is an interface card that provides an interface function for the direction opposite of the first direction of the ring network 10 (hereinafter, referred to as a "second direction" for descriptive purposes). The first IF card 20 and the second IF card 22 each include a frame acquisition unit 30, a frame output unit 32, and a block setting unit 34.

The frame acquisition unit 30 acquires a user frame from the ring network 10 and passes the user frame to the switching unit 26. The frame acquisition unit 30 acquires a supervisory frame for monitoring the communication status of the communication line among the communication apparatuses 12 (hereinafter, also referred to as a "ring supervisory frame") from the ring network 10 and passes the ring supervisory frame to the operation control unit 28. In accordance with an instruction from the operation control unit 28, the frame acquisition unit 30 passes a supervisory frame for monitoring the communication status inside the communication apparatuses 12 (hereinafter, also referred to as an "internal supervisory frame") to the switching unit 26.

The frame output unit 32 acquires the user frame from the switching unit 26 and passes the user frame to the ring network 10. The frame output unit 32 acquires the ring supervisory frame from the operation control unit 28 and passes the ring supervisory frame to the ring network 10. The frame output unit 32 also acquires the internal supervisory frame from the switching unit 26 and gives notification to the operation control unit 28 indicating that the internal supervisory frame has arrived.

The block setting unit 34 receives a signal from the operation control unit 28 instructing the setting of a block point. Upon the receipt of the signal, the block setting unit 34 sets a block point of the ring network 10 to its own interface card. When the block point is set, the frame acquisition unit 30 terminates a process of acquiring a user frame from the ring network 10, and the frame output unit 32 terminates the process of passing a user frame to the ring network 10.

The third IF card 24 is an interface card that provides an interface function for one other communication network 14. The third IF card 24 acquires a user frame from said other communication network 14 and passes the user frame to the switching unit 26. The third IF card 24 acquires the user frame from the switching unit 26 and passes the user frame to said other communication network 14.

The switching unit 26 receives user frames from the first IF card 20, the second IF card 22, and the third IF card 24. In reference to the path-selection rule for determining a transmission path so as to bypass a block point of the ring network 10, the switching unit 26 determines the transmission destination (any one of the first IF card 20, the second IF card 22, and the third IF card 24 in this case) of a user frame in accordance with the transmission destination address specified by the user frame. The switching unit 26 then passes the user frame to the transmission destination.

The switching unit 26 receives internal supervisory frames from the first IF card 20 and the second IF card 22. An internal supervisory frame passed from the first IF card 20 specifies the second IF card 22 as the transmission destination. Thus, the switching unit 26 passes the internal supervisory frame to the second IF card 22. On the other hand, an internal supervisory frame passed from the second IF card 22 specifies the first IF card 20 as the transmission destination. Thus, the switching unit 26 passes the internal supervisory frame to the first IF card 20. In other words, the internal supervisory frame is transmitted inside the communication apparatuses 12 by using the same path as that used for the user frame.

The operation control unit 28 controls the operation mode of the communication apparatuses 12 such as a supervisory process of the communication status inside the communication apparatus 12 and a setting process of a block point of the communication apparatus 12. The operation control unit 28 includes a ring protocol processor 40, a supervisory-mode setting unit 42, a supervisory-frame setting unit 44, a communication-status determination unit 46, and a block control unit 48.

The ring protocol processor 40 detects the communication status of the communication line among the communication apparatuses 12 based on the ring protocol. More specifically, the ring protocol processor 40 receives a ring supervisory frame transmitted from another communication apparatus 12 via the frame acquisition unit 30. The ring protocol processor 40 transmits the ring supervisory frame, which is to be transmitted from its own communication apparatus 12, to other communication apparatuses 12 via the frame output unit 32. The ring protocol processor detects the setting position of a block point in the ring network 10 by the transmission and reception of the supervisory frame and notifies the switching unit 26 of a path-selection rule after determining the path-selection rule so as to bypass the block point.

The ring protocol processor 40 of the embodiment transmits, when a new block point is set to its interface card by the block control unit 48 that will be described hereinafter, a ring supervisory frame to other communication apparatuses 12, indicating that the block point is set to its interface card. At the same time, the ring protocol processor 40 notifies the switching unit 26 of a path-selection rule, which is updated so as to bypass the new block point.

The supervisory-mode setting unit 42 receives from an operation manager of a communication apparatus 12 the settings of the supervisory mode (for example, the standard for determining the time interval for monitoring, the format and details of the supervisory frame, or a standard for determining whether the communication status is normal) of the communication status inside the communication apparatus 12. The supervisory-frame setting unit 44 sets internal supervisory frames with the time interval for monitoring, the time interval having been set by the operation manager, and passes the internal supervisory frames from the frame acquisition unit 30 of the first IF card 20 and from the frame acquisition unit 30 of the second IF card 22.

The communication-status determination unit 46 receives from the frame output unit 32 of the first IF card 20 and from the frame output unit 32 of the second IF card 22 notifications indicating that the internal supervisory frames have arrived. In accordance with the determination standard set by the operation manager, the communication-status determination unit 46 determines whether the communication status inside the communication apparatus 12, more specifically, the communication status between the first IF card 20 and the second IF card 22 in bi-direction, is normal.

For example, the communication-status determination unit 46 may determine that the communication status inside the apparatus is abnormal when the communication-status determination unit 46 does not receive the notifications, which indicate that the internal supervisory frames have arrived, after a predetermined period of time (for example, after the time interval for monitoring). When the format or the details of the internal supervisory frames received by the frame output units 32 do not match the format or the details of the internal supervisory frames that are output by the frame acquisition units 30, the communication-status determination unit 46 may also determine that the communication status inside the apparatus is abnormal.

The block control unit 48 sets a block point to the first IF card 20 or to the second IF card 22 when the communication-status determination unit 46 determines that the communication status inside the communication apparatus 12 is abnormal. More specifically, the block control unit 48 passes to the block setting unit 34 of the first IF card 20 or the second IF card 22 a signal instructing the setting of a block point.

An explanation is given of the operation of the above configuration in the following.

Figure 6:
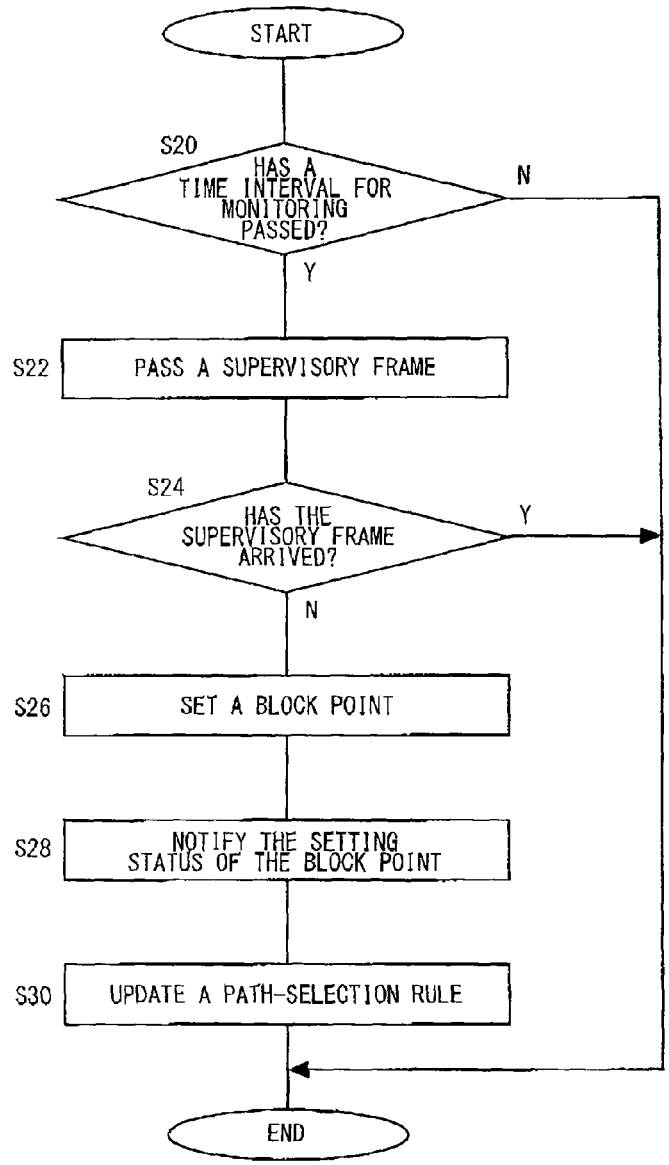
FIG. 6 is a flowchart illustrating the operation of the communication apparatus.

FIG. 6 is a flowchart illustrating the operation of a communication apparatus 12. After a predetermined time interval for monitoring (Y in S20), the supervisory-frame setting unit 44 instructs the frame acquisition unit 30 of the first IF card 20 to pass an internal supervisory frame to the frame output unit 32 of the second IF card 22. The supervisory-frame setting unit 44 also instructs the frame acquisition unit 30 of the second IF card 22 to pass an internal supervisory frame to the frame output unit 32 of the first IF card 20 (S22). When the internal supervisory frame does not reach the frame output unit 32 of the second IF card 22 or the frame output unit 32 of the first IF card 20 within the predetermined time (N in S24), the communication-status determination unit 46 determines that the communication status inside the communication apparatus 12 is abnormal. The block control unit 48 sets a new block point to the first IF card 20 or to the second IF card 22 (S26). The ring protocol processor 40 notifies other communication apparatuses 12 of a ring supervisory frame that indicates that the new block point has been set (S28).

The ring protocol processor 40 then updates the path-selection rule so that the new block point is bypassed and notifies the switching unit 26 of the updated path-selection rule (S30). As a result, the switching unit 26 passes the user frame to the first IF card 20 or the second IF card 22, to which no block point is set. Thus, the process of relaying the user frame to the ring network 10 can be maintained. When the internal supervisory frame reaches the frame output unit 32 of the second IF card 22 and the frame output unit 32 of the first IF card 20 within the predetermined time (Y in S24), the communication-status determination unit 46 determines that the communication status inside the communication apparatus 12 is normal, and the processes of S26-S30 are skipped. When the time interval for monitoring is not reached (N in S20), the processes after S22 are skipped and the flow in the figure is ended.

The path-selection rule is also updated so that the new block is bypassed in other communication apparatuses 12 that have received the ring supervisory frame indicating that the new block point has been set. The communication apparatus 12, to which the previous block point has been set until the new block point is set, opens the previous block point.

Figure 7:
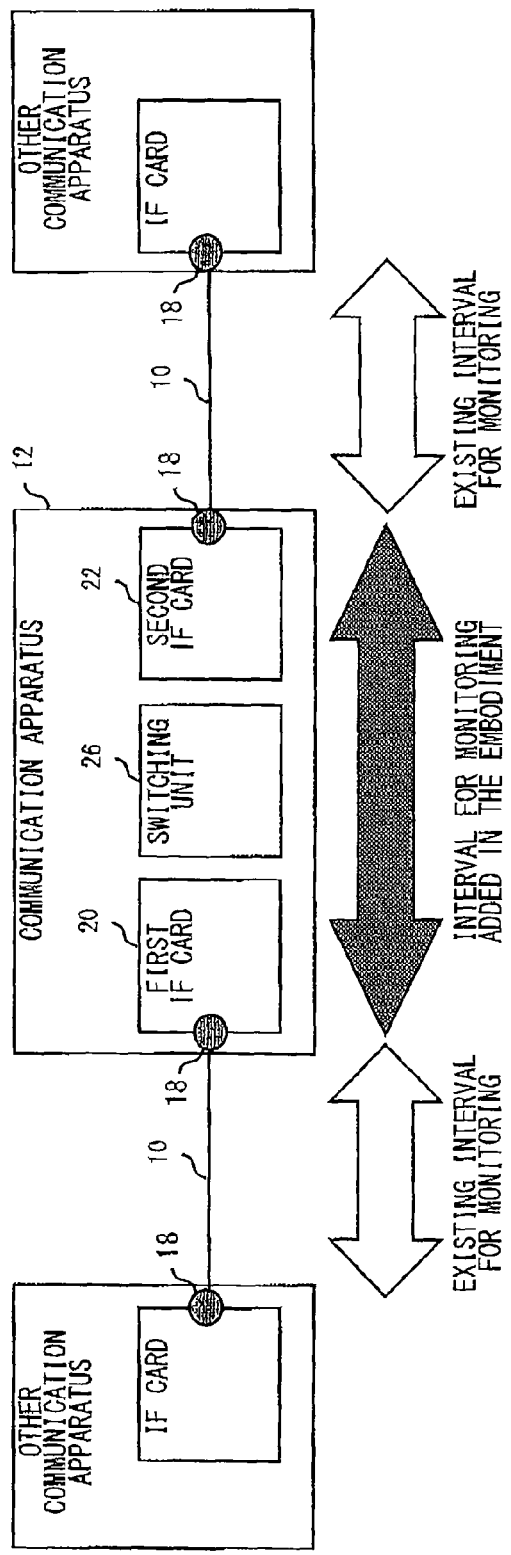
FIG. 7 is a schematic diagram illustrating an interval for monitoring in the first embodiment.

FIG. 7 schematically illustrates an interval for monitoring in the embodiment. In the embodiment, in addition to the communication line, which is the existing interval for monitoring, among the communication apparatuses 12, the interior portions of the communication apparatuses 12 also become intervals for monitoring.

According to the communication apparatuses 12 of the embodiment, in the event a failure occurs inside a communication apparatus 12, providing a block point to the communication apparatus 12 allows for a data frame to be saved by the use of a ring protocol. More specifically, by setting a new block point to the communication apparatus 12 in which a failure occurs internally, a transmission path of a data frame is changed so that the new block point is bypassed in the whole communication system 100. This allows for the communication system 100 to be achieved where the transmission of a data frame can be maintained even when a failure occurs inside a communication apparatus 12.

Second Embodiment

In the first embodiment, one interval for monitoring, from the first IF card 20 to the second IF card 22, is provided, and a block point is set to the first IF card 20 or to the second IF card 22 upon the generation of a failure inside the communication apparatus 12. Therefore, a block point may be set to the second IF card 22 even when the failure is generated inside the first IF card 20. In this case, a data frame cannot be relayed between the communication apparatus 12 and the ring network 10 even when the second IF card 22 is normal. In the present embodiment, the interval for monitoring, from the first IF card 20 to the second IF card 22, is segmentalized so as to set a block point to an appropriate interface card.

Figure 8:
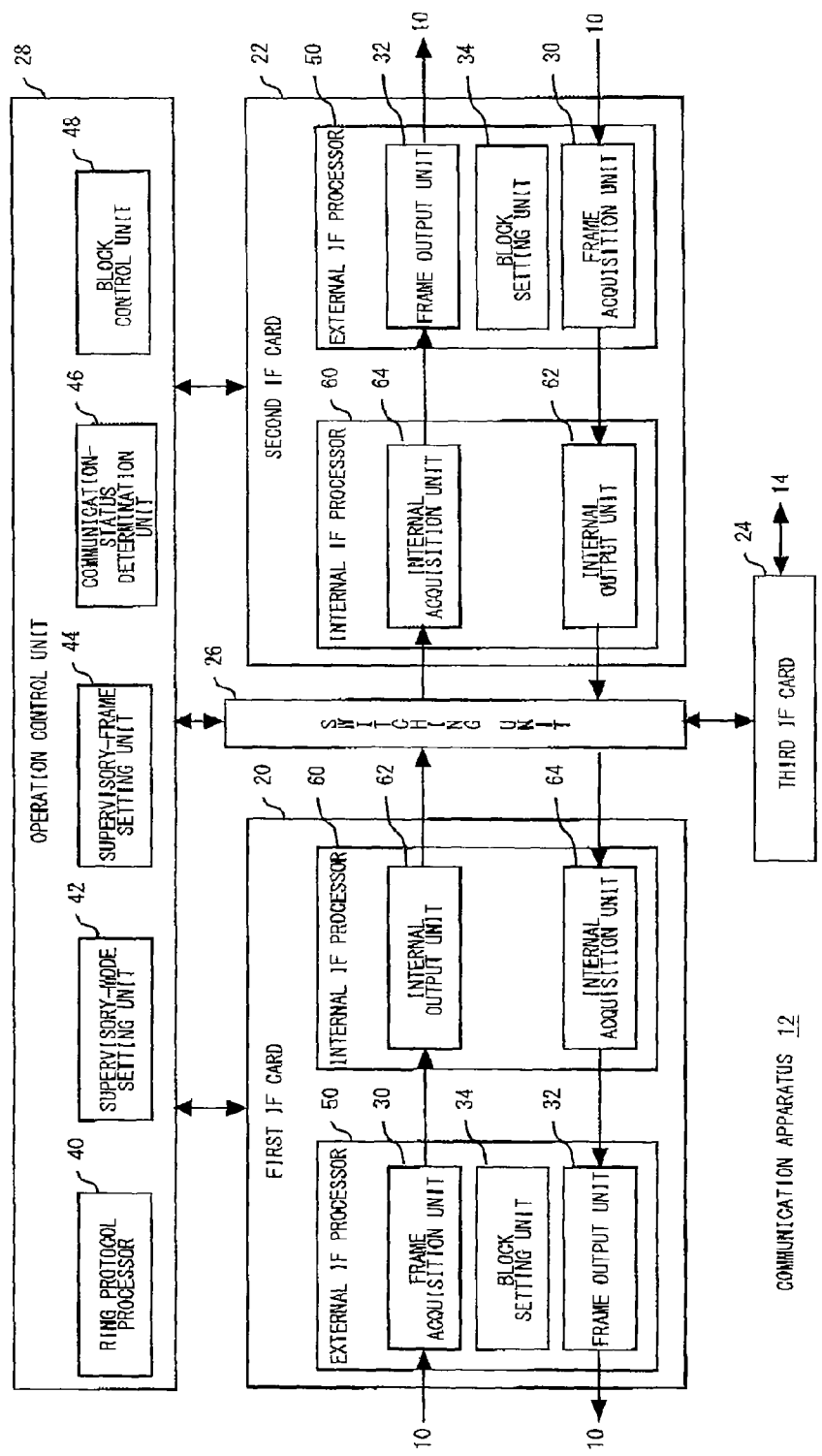
FIG. 8 is a block diagram illustrating a functional configuration, in the second embodiment, of the communication apparatus shown in FIG. 1.

FIG. 8 is a block diagram illustrating a functional configuration, in the second embodiment, of the communication apparatus 12 shown in FIG. 1. In the figure, like numerals represent like functional blocks in FIG. 5, and the overlapping description thereof is appropriately omitted.

The first IF card 20 includes an external IF processor 50, which is at the endpoint on the ring network 10 side inside the interface card, and an internal IF processor 60, which is at the endpoint on the switching unit 26 side, in other words, on the second IF card 22 side. Various functional blocks (not shown) may be included between the external IF processor 50 and the internal IF processor 60. For example, a buffer for temporarily retaining a data frame may be included. The second IF card 22 also has a similar configuration.

The external IF processor 50 includes a frame acquisition unit 30, a frame output unit 32, and a block setting unit 34. The internal IF processor 60 includes an internal output unit 62 and an internal acquisition unit 64.

The frame acquisition unit 30 acquires a user frame from the ring network 10 and passes the user frame to the internal output unit 62. The frame acquisition unit 30 passes an internal supervisory frame to the internal output unit 62 in accordance with an instruction sent from the operation control unit 28. The frame output unit 32 receives the user frame from the internal acquisition unit 64 and passes the user frame to the ring network 10. The frame output unit 32 also receives the internal supervisory frame from the internal acquisition unit 64 and gives notification to the operation control unit 28, indicating that the internal supervisory frame has arrived.

The internal output unit 62 receives the user frame from the frame acquisition unit 30 and passes the user frame to the switching unit 26. The internal output unit 62 also receives the internal supervisory frame from the frame acquisition unit 30 and gives notification to the operation control unit 28, indicating that the internal supervisory frame has arrived. Furthermore, the internal output unit 62 passes an internal supervisory frame to the switching unit 26 in accordance with an instruction sent from the operation control unit 28.

The internal acquisition unit 64 acquires the user frame from the switching unit 26 and passes the user frame to the frame output unit 32. The internal acquisition unit 64 also receives the internal supervisory frame from the switching unit 26 and gives notification to the operation control unit 28 indicating that the internal supervisory frame has arrived. Furthermore, the internal acquisition unit 64 passes the internal supervisory frame to the frame output unit 32 in accordance with an instruction sent from the operation control unit 28.

The supervisory-frame setting unit 44 sets internal supervisory frames with the time interval for monitoring, the time interval having been determined by the operation manager, and passes the internal supervisory frames from the frame acquisition unit 30 of the first IF card 20, from the internal output unit 62, and from the internal acquisition unit 64. The supervisory-frame setting unit 44 passes the internal supervisory frames from the frame acquisition unit 30 of the second IF card 22, from the internal output unit 62, and from the internal acquisition unit 64.

The communication-status determination unit 46 receives, from the internal output unit 62 of the first IF card 20, from the internal acquisition unit 64, and from the frame output unit 32, notifications indicating that the internal supervisory frames have arrived. The communication-status determination unit 46 receives, from the internal acquisition unit 64 of the second IF card 22, from the frame output unit 32, and from the internal output unit 62, notifications indicating that the internal supervisory frames have arrived.

The communication-status determination unit 46 determines that the communication status inside the first IF card 20 is abnormal when at least either the communication status between the frame acquisition unit 30 and the internal output unit 62 or the communication status between the internal acquisition unit 64 and the frame output unit 32 is abnormal. The same applies to the determination of the communication status inside the second IF card 22. The communication-status determination unit 46 determines that the communication status between the first IF card 20 and the second IF card 22 is abnormal when at least either the communication status between the internal output unit 62 of the first IF card 20 and the internal acquisition unit 64 of the second IF card 22 or the communication status between the internal output unit 62 of the second IF card 22 and the internal acquisition unit 64 of the first IF card 20 is abnormal.

The block control unit 48 sets a block point to the first IF card 20 when the communication-status determination unit 46 determines that the communication status inside the first IF card 20 is abnormal. The block control unit 48 sets a block point to the second IF card 22 when the communication status inside the second IF card 22 is determined to be abnormal. The block control unit 48 sets a block point to the first IF card 20 or the second IF card 22 when the communication status between the first IF card 20 and the second IF card 22 is determined to be abnormal.

An explanation is given of the operation of the above configuration in the following.

Triggered by the passage of the time interval for monitoring, the supervisory-frame setting unit 44 transmits an internal supervisory frame, while the internal portion of the first IF card 20, the internal portion of the second IF card 22, and the interval between the first IF card 20 and the second IF card 22 are set to be an interval for monitoring. The communication-status determination unit 46 determines the normality of the communication status in each interval for monitoring. The block control unit 48 sets a block point to the interface card corresponding to the interval for monitoring that is determined to be abnormal.

Figure 9:
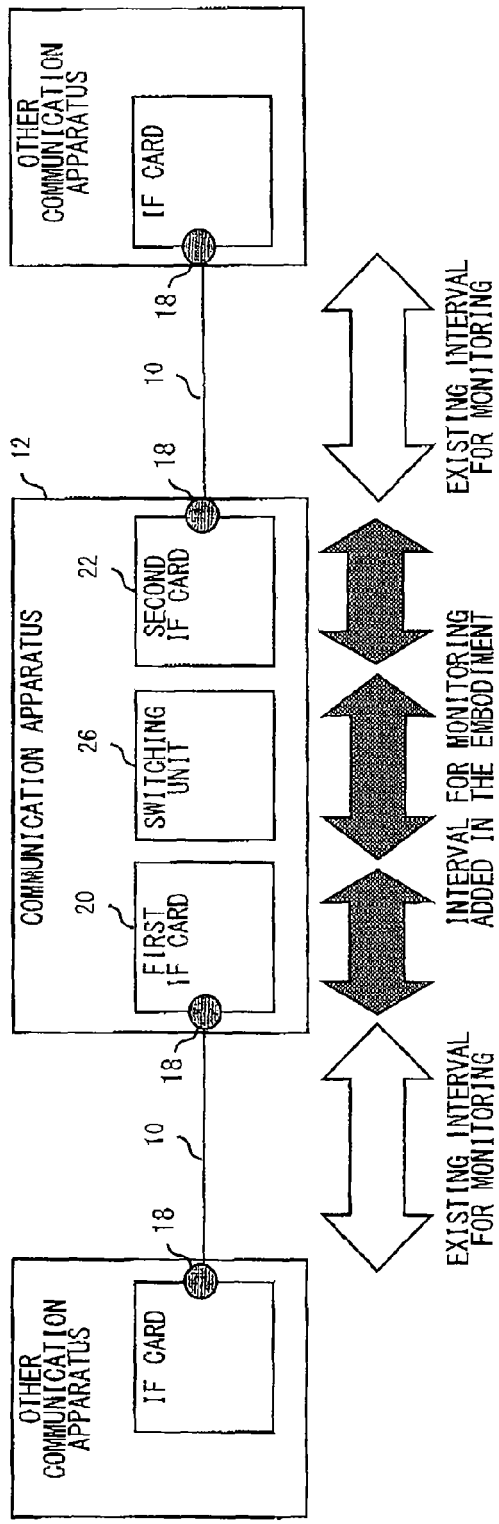
FIG. 9 is a schematic diagram illustrating an interval for monitoring in the second embodiment.

FIG. 9 schematically illustrates an interval for monitoring in the embodiment. In the embodiment, in addition to the communication line, which is the existing interval for monitoring, among the communication apparatuses 12, the interior portions of the communication apparatuses 12 also become intervals for monitoring. Furthermore, the interval for monitoring inside the communication apparatus 12 is segmentalized into the internal portion of the first IF card 20, the internal portion of the second IF card 22, and the interval between the first IP card 20 and the second IF card 22, and the normality of the communication status is determined for each interval for monitoring.

According to the communication apparatus 12 of the present embodiment, a block point can be set to the interface card in which the communication status is abnormal. This further ensures the relay of a data frame with the ring network 10 via relay units in which no failure is generated. For example, when a failure is generated inside the first IF card 20, a block point is set to the first IF card 20. Thus, the second IF card 22 can continue to relay a data frame to the ring network 10. Thus, the transmission of a data frame, from the ring network 10 to the second IF card 22 and subsequently to the switching unit 26, to the third IF card 24, and to the other communication network 14, can be continued.

Third Embodiment

There are some interface cards that are provided with multiple ports where the ports are connected to a different communication network (hereinafter, referred to as a "first ring network 10a" and a "second ring network 10b"), respectively. Such an interface card is provided with multiple external IF processors 50 shown in FIG. 8. The external IF processors 50 are hereinafter referred to as an "external IF processor A 50a" and an "external IF processor B 50b." The internal IF processor 60 acquires data frames each output from the external IF processor A 50a and the external IF processor B 50b and passes the data frames to the switching unit 26 in an integrated fashion.

In such an interface card, when a block point is to be set in accordance with the communication status between the external IF processor A 50 a and the internal IF processor 60 and with the communication status between the external IF processor B 50b and the internal IF processor 60, it is desirable that at least one block point is set to the internal IF processor 60. In other words, regardless of in which communication path the failure is detected, there is a possibility that the failure affects both the first ring network 10a and the second ring network 10b since the failure is generated at least inside the interface card. Setting the block point to the internal IF processor 60 can disconnect the transmission of a data frame to both communication networks in an integrated fashion.

Figure 10:
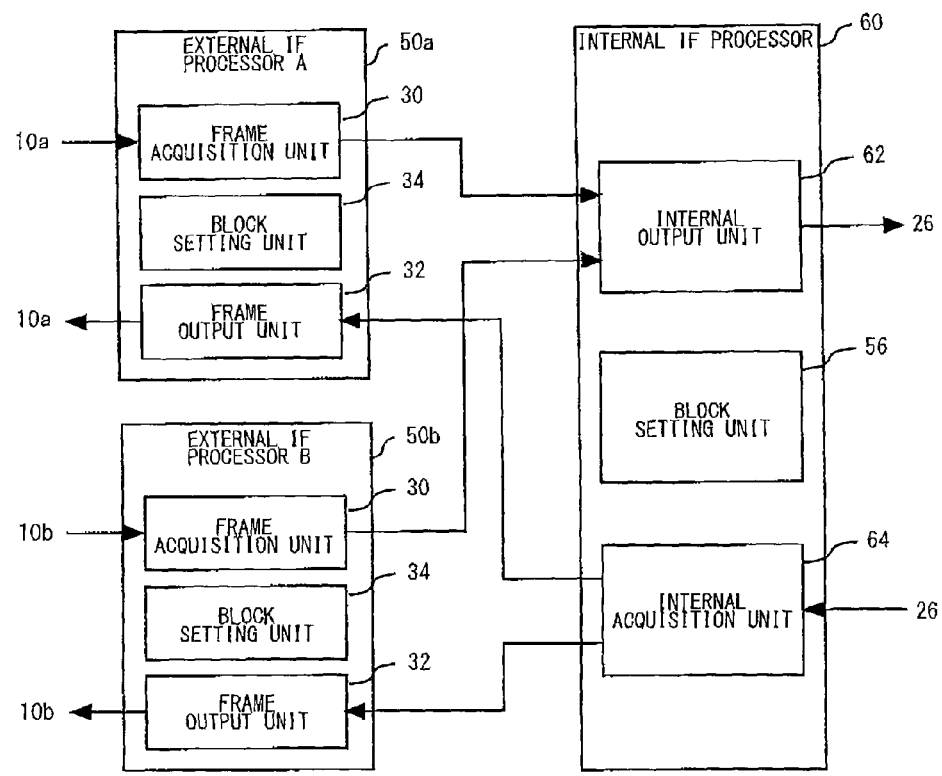
FIG. 10 is a block diagram illustrating a functional configuration, in the third embodiment, of the communication apparatus shown in FIG. 1.

FIG. 10 is a block diagram illustrating a functional configuration, in the third embodiment, of the communication apparatus 12 shown in FIG. 1. The figure shows a detailed configuration of the first IF card 20 shown in FIG. 8. The second IF card 22 in FIG. 8 also has a similar configuration. The functional blocks in FIG. 10 have functions similar to those in the second embodiment.

The internal output unit 62 receives user frames and internal supervisory frames from the frame acquisition unit 30 of the external IF processor A 50a and the frame acquisition unit 30 of the external IF processor B 50b in an integrated fashion. The internal acquisition unit 64 passes user frames and internal supervisory frames to the frame acquisition unit 30 of the external IF processor A 50a and the frame acquisition unit 30 of the external IF processor B 50b in an integrated fashion. The first IF card 20 may further include a data processor (not shown) that, for example, synthesizes, isolates, and sorts data frames related to the external IF processor A 50a and data frames related to the external IF processor B 50b.

The supervisory-frame setting unit 44 transmits supervisory frames between the frame acquisition unit 30 of the external IF processor A 50a and the internal output unit 62 and between the frame acquisition unit 30 of the external IF processor B 50b and the internal output unit 62, respectively, so as to monitor the communication status inside the first IF card 20. The supervisory-frame setting unit 44 also transmits supervisory frames between the internal acquisition unit 64 and the frame output unit 32 of the external IF processor A 50a and between the internal acquisition unit 64 and the frame output unit 32 of the external IF processor B 50b, respectively.

The communication-status determination unit 46 determines the normality of the communication status in each of the above intervals. The block control unit 48 sets a block point to the first IF card 20 when the communication status of any one of the above intervals is determined to be abnormal. More specifically, in addition to setting a block point to the internal IF processor 60, the block control unit 48 sets a block point to the external IF processor A 50a or the external IF processor B 50b, whose communication status is determined to be abnormal.

Figure 11:
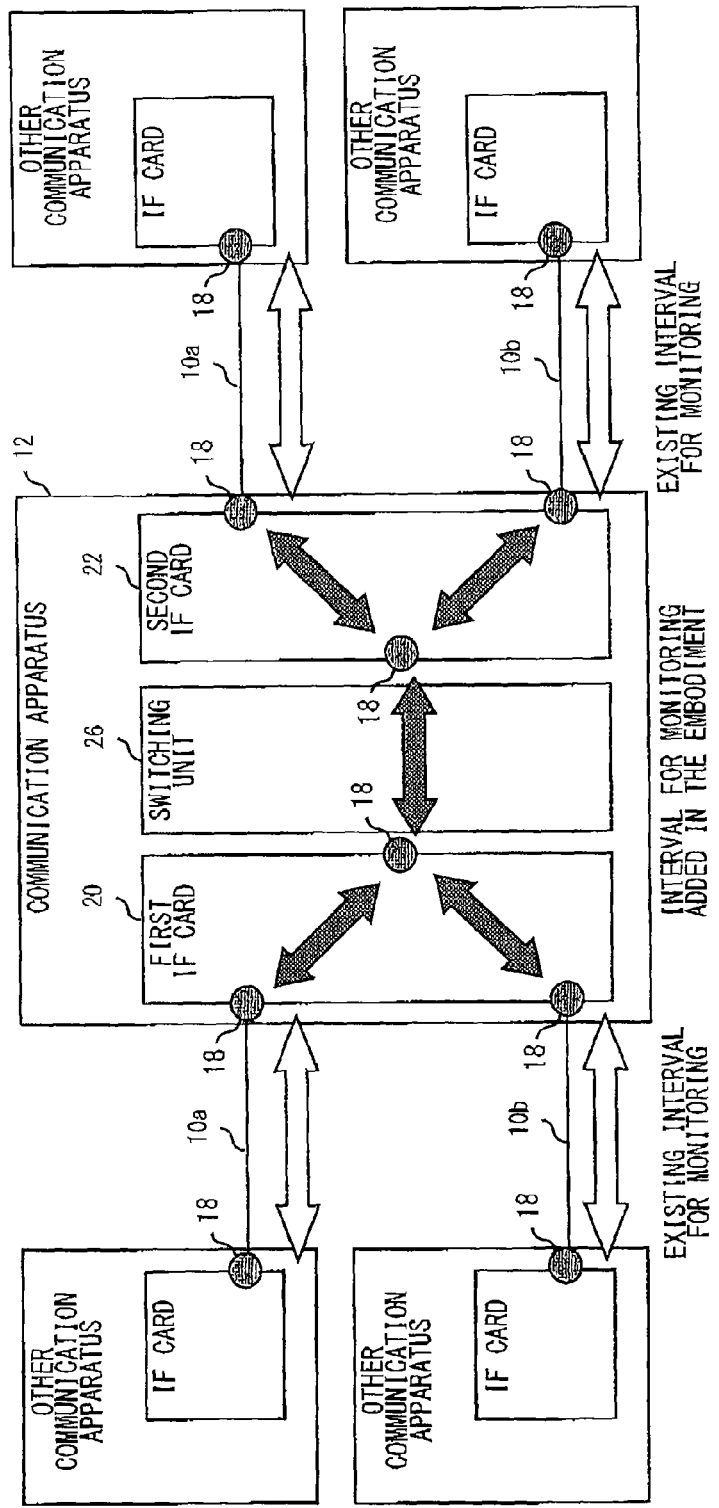
FIG. 11 is a schematic diagram illustrating an interval for monitoring in the third embodiment.

FIG. 11 schematically illustrates an interval for monitoring in the embodiment. In the embodiment, as the communication status inside an interface card, the communication status of respective combinations of multiple external IF processors 50 and the internal processor 60 is monitored. A block point is set also to the internal IF processor 60.

According to the communication apparatus 12 of the embodiment, a block point is set to the internal interface of an interface card in which a failure is generated. This allows for the relay of a data frame via the interface card to be disconnected in an integrated fashion even when the interface card is connected to multiple communication networks. For example, when one interface card is connected to multiple ring networks, a new block point is set not only to the ring network connected to the external interface in which an abnormal communication status is detected but also to another ring network connected to the interface card. Therefore, a data-frame rescue process by a ring protocol can be performed in multiple ring networks.

Described above is an explanation based on the embodiments of the present invention. The embodiment is intended to be illustrative only, and it will be obvious to those skilled in the art that various modifications to constituting elements and processes could be developed and that such modifications are also within the scope of the present invention. An exemplary variation is shown in the following.

A first exemplary variation is now described in detail. With regard to the configurations of the first IF card 20 and the second IF card 22 described in the second or third embodiment, the respective configuration may be applied to only either the first IF card 20 or the second IF card 22. According to the exemplary variation, with regard to the interface card to which the configuration described in the second or third embodiment is applied, a new block point can be set in the ring network 10 to the interface card in accordance with the internal failure. Interface cards having only conventional functions and interface cards having the functions described in the second or third embodiment can coexist in the same communication apparatus 12. In this case, multiple interface cards can be separately upgraded to interface cards with enhanced functions.

Figure 12:
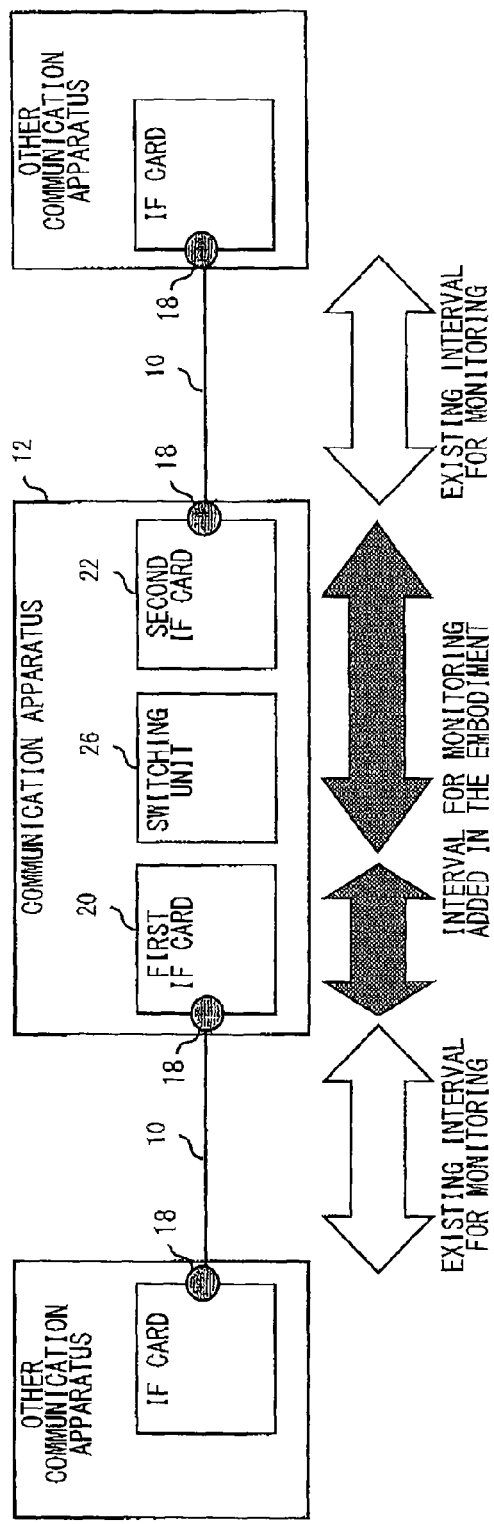
FIG. 12 is a schematic diagram illustrating an interval for monitoring in the second exemplary variation.

A second exemplary variation is now described in detail. With regard to the configurations of the first IF card 20 and the second IF card 22 described in the second embodiment, the respective configurations may be applied to only either the first IF card 20 or the second IF card 22, and the IF card to which the respective configuration has not been applied may have the configuration described in the first embodiment. FIG. 12 schematically illustrates an interval for monitoring in the exemplary variation. The figure illustrates the interval for monitoring in the communication apparatus 12 where the first IF card 20 to which the configuration described in the second embodiment is applied and the second IF card 22 to which the configuration described in the first embodiment coexist. In this case, a block point may be set to the external interface of the first IF card 20 when a failure occurs inside the first IF card 20. A block point may be set to the external interface of the second IF card 22 when a failure occurs in the switching unit 26 and the second IF card 22.

According to the second exemplary variation, with regard to the interface card to which the configuration described in the second embodiment is applied, a new block point can be set in the ring network 10 to the interface card in accordance with the internal failure. With regard to the interface card to which the configuration described in the first embodiment is applied, a new block point can be set to an appropriate position. Since the interface card described in the second embodiment has more implementation points than the interface card described in the first embodiment has, the manufacturing cost thereof is generally higher. Thus, according to the exemplary variation, multiple interface cards can be separately upgraded to interface cards with enhanced functions in accordance with the cost that can be contributed to the interface cards of the communication apparatus 12.

Figure 13:
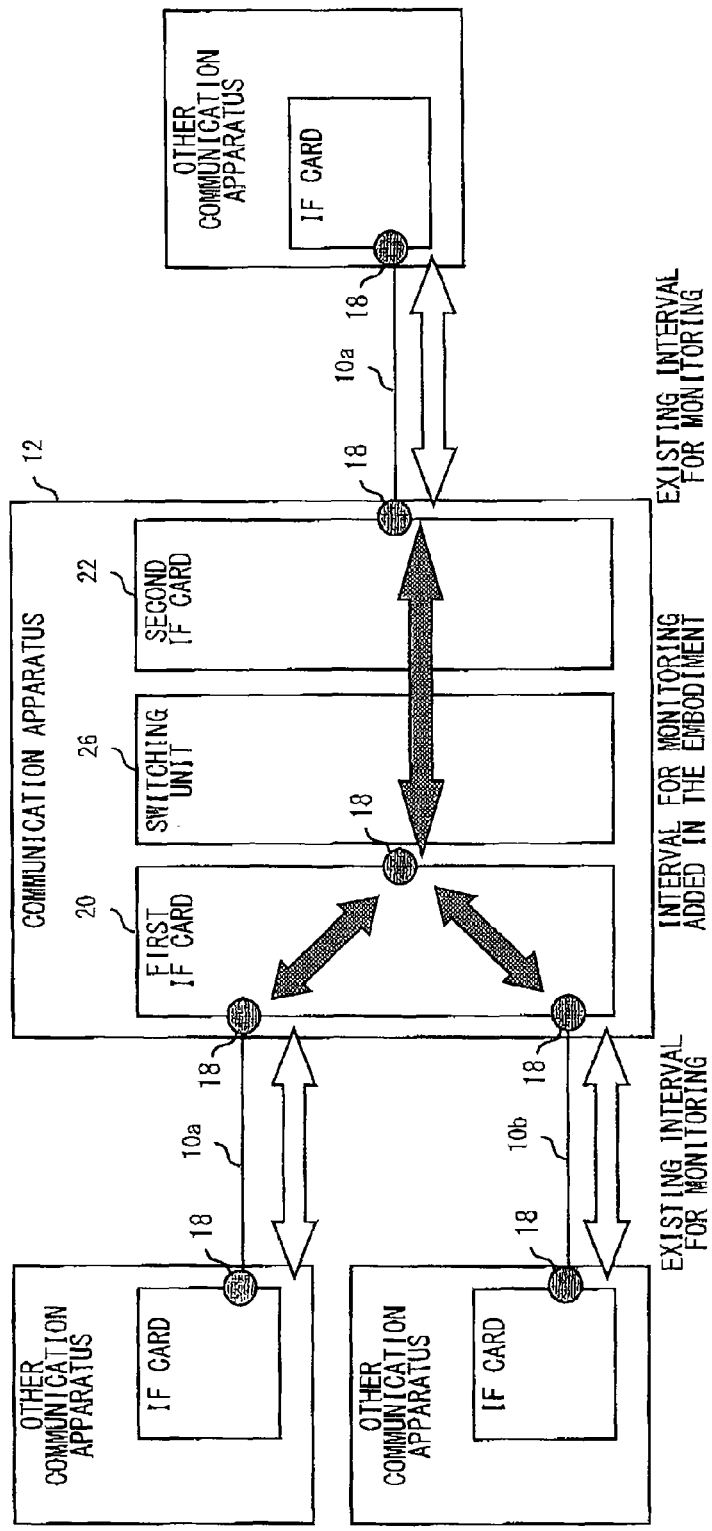
FIG. 13 is a schematic diagram illustrating a monitoring interval in the third exemplary variation.

A third exemplary variation is now described in detail. With regard to the configurations of the first IF card 20 and the second IF card 22 described in the third embodiment, the respective configurations may be applied to only either the first IF card 20 or the second IF card 22, and the IF card to which the respective configuration has not been applied may have the configuration described in the first embodiment. FIG. 13 schematically illustrates an interval for monitoring in the exemplary variation. The figure illustrates the interval for monitoring in the communication apparatus 12 where the first IF card 20 to which the configuration described in the third embodiment is applied and the second IF card 22 to which the configuration described in the first embodiment coexist. In this case, block points may be set to the external interface and the internal interface of the first IF card 20 when a failure occurs inside the first IF card 20. A block point may be set to the external interface of the second IF card 22 when a failure occurs in the switching unit 26 and the second IF card 22.

According to the third exemplary variation, with regard to the interface card to which the configuration described in the third embodiment is applied, a new block point can be set in the ring network 10 to the interface card in accordance with the internal failure. With regard to the interface card to which the configuration described in the second embodiment is applied, a new block point can be set to an appropriate position. Since the interface card described in the third embodiment has more implementation points than the interface card described in the first embodiment has, the manufacturing cost thereof is generally higher. Thus, according to the exemplary variation, multiple interface cards can be separately upgraded to interface cards with enhanced functions, depending on the cost that can be contributed for the interface cards of the communication apparatus 12.

A first exemplary variation is now described in detail. A block point may be set only to the internal IF processor 60 in the third embodiment. In the exemplary embodiment, a block point can be set to multiple communication networks in an integrated fashion. Since it is not necessary to set block points to respective multiple external IF processors 50, the implementation points are reduced, and the manufacturing cost of the interface is thus lowered.

Therefore, it will be obvious to those skilled in the art that the function to be achieved by each constituent requirement described in the claims may be achieved by each constituting element shown in the embodiments and in the modifications or by a combination of the constituting elements.

What is claimed is:

1. A communication apparatus constituting a ring network where a block point that disconnects the relay of a data frame is set to at least one of a plurality of communication apparatuses that are connected in a ring shape, the communication apparatus comprising:
    a first relay unit operative to perform a relay process of a data frame in a first direction of the ring network;
    a second relay unit operative to perform a relay process of a data frame in a second direction, which is different from the first direction, of the ring network;
    a monitoring unit operative to monitor the internal communication status within the communication apparatus, from the first relay unit to the second relay unit by internally transmitting a supervisory frame between the first relay unit and the second relay unit within the communication apparatus;
    a block control unit operative to set a new block point inside the communication apparatus to either the first relay unit or the second relay unit when the communication status is abnormal; and
    a notification unit operative to notify other communication apparatuses that constitute the ring network of information for notifying the switching of a block point in the ring network, which indicates that the new block point has been set.

2. The communication apparatus according to claim 1, wherein
    the monitoring unit monitors, from the communication status from the first relay unit to the second relay unit, the communication status inside the first relay unit as a first communication status, and the communication status inside the second relay unit as a second communication status, and
    the block control unit sets a new block point to the first relay unit when the first communication status is abnormal and sets a new block point to the second relay unit when the second communication status is abnormal.

3. The communication apparatus according to claim 2, wherein
    the first relay unit and the second relay unit each include:
    a ring interface that works as an interface to the ring network;
    one other interface that works as an interface to another communication network different from the ring network; and
    an internal interface that relays both the data frame relayed via the ring interface and the data frame relayed via said other interface to another processor inside the apparatus in an integrated fashion, wherein
    the block control unit sets a new block point to at least the internal interface of the relay unit, either the first relay unit or the second relay unit, to which the new block point needs to be set.

4. The communication apparatus according to claim 1, wherein
    the monitoring unit monitors, from the communication status from the first relay unit to the second relay unit, the communication status inside either the first relay unit or the second relay unit as an internal communication status, and
    the block control unit sets a new block point to the relay unit, either the first relay unit or the second relay unit, whose communication status is being monitored, when the internal communication status is abnormal.

5. The communication apparatus according to claim 4, wherein
    the relay unit, either the first relay unit or the second relay unit, whose internal communication status is being monitored includes:
    a ring interface that works as an interface to the ring network;
    one other interface that works as an interface to another communication network different from the ring network; and
    an internal interface that relays both the data frame relayed via the ring interface and the data frame relayed via said other interface to another processor inside the apparatus in an integrated fashion, wherein
    the block control unit sets, when setting a new block point to either the first relay unit or the second relay unit, whose internal communication status is being monitored, the new block point to at least the internal interface of the relay unit whose internal communication status is being monitored.

6. The communication apparatus according to claim 1 further comprising a switching unit operative to pass, upon the receipt of a data frame to be passed to the ring network, the data frame to the relay unit, either the first relay unit or the second relay unit, to which a block point is not set, even when the block point is set to either the first relay unit or the second relay unit.

7. An interface card mounted in a communication apparatus constituting a ring network where a block point that disconnects the relay of a data frame is set inside at least one of a plurality of communication apparatuses that are connected in a ring shape, the interface card comprising:
   a relay unit operative to perform a relay process of a data frame in a first direction of the ring network;
   a communication-status detection unit operative to notify a predetermined controlling process of information indicating the status of internal communication with another interface card mounted in the communication apparatus that performs a relay process of a data frame in a second direction, which is different from the first direction, of the ring network; and
   a block setting unit operative, when being instructed to set a new block point that replaces the current block point in the ring network, to set a block point for disconnecting the relay of the data frame by the relay unit to the interface card,
   wherein the communication-status detection unit detects the internal status of communication with another interface card mounted in the communication apparatus by internally transmitting a supervisory frame between the interface card and the other interface card mounted in the communication apparatus.

8. A failure handling method performed by a communication apparatus constituting a ring network where a block point that disconnects the relay of a data frame is set to at least one of a plurality of communication apparatuses that are connected in a ring shape, the failure handling method comprising:
   monitoring the internal communication status inside the communication apparatus from the interface in the first direction of the ring network to the interface in the second direction, which is different from the first direction, by internally transmitting a supervisory frame between the interface in the first direction and the interface in the second direction within the communication apparatus;
   setting a new block point inside the communication apparatus to either the interface in the first direction or the interface in the second direction when the communication status is abnormal; and
   notifying other communication apparatuses that constitute the ring network of information for notifying the switching of a block point in the ring network, which indicates that the new block point has been set.

* * * * *